(12) United States Patent
Rak (10) Patent No.: US 11,346,448 B2
(45) Date of Patent: May 31, 2022

(54) CARBON SEAL ASSEMBLY

(71) Applicant: PRATT & WHITNEY CANADA CORP., Longueuil (CA)

(72) Inventor: Pawel Rak, Rzeszow (PL)

(73) Assignee: PRATT & WHITNEY CANADA CORP., Longueuil (CA)

( * ) Notice: Subject to any disclaimer, the term of this patent is extended or adjusted under 35 U.S.C. 154(b) by 148 days.

(21) Appl. No.: 16/589,588

(22) Filed: Oct. 1, 2019

(65) Prior Publication Data

US 2021/0095763 A1 Apr. 1, 2021

(30) Foreign Application Priority Data

Sep. 27, 2019 (EP) .................................... 19200282

(51) Int. Cl.
*F16J 15/02* (2006.01)
*F16J 15/30* (2006.01)
*F16J 15/34* (2006.01)

(52) U.S. Cl.
CPC ............. *F16J 15/028* (2013.01); *F16J 15/30* (2013.01); *F16J 15/3452* (2013.01)

(58) Field of Classification Search
CPC ........ F16J 15/028; F16J 15/30; F16J 15/3452; F16J 15/44; F16J 15/441; F16J 15/442
See application file for complete search history.

(56) References Cited

U.S. PATENT DOCUMENTS

| | | | |
|---|---|---|---|
| 2,948,555 A * | 8/1960 | Wright .................... | F16J 15/441 277/422 |
| 3,819,191 A | 6/1974 | Voitik | |
| 5,014,999 A | 5/1991 | Makhobey | |
| 5,527,045 A | 6/1996 | Pondelick et al. | |
| 5,813,830 A | 9/1998 | Smith et al. | |
| 7,175,388 B2 * | 2/2007 | Labbe ................... | F01D 11/003 415/174.5 |
| 7,648,143 B2 | 1/2010 | Davis et al. | |
| 8,714,557 B2 | 5/2014 | Miller et al. | |
| 8,777,229 B2 | 7/2014 | Davis | |
| 9,097,347 B2 | 8/2015 | Tissakht et al. | |
| 9,309,975 B2 * | 4/2016 | Kostka ................... | F16J 15/443 |
| 9,359,912 B2 | 6/2016 | Ullah et al. | |
| 9,546,560 B2 | 1/2017 | Larson | |
| 9,631,508 B2 | 4/2017 | Blais et al. | |
| 9,638,326 B2 | 5/2017 | Haynes | |
| 9,726,031 B2 | 8/2017 | Cusack et al. | |
| 9,890,650 B2 | 2/2018 | Von Berg et al. | |

(Continued)

FOREIGN PATENT DOCUMENTS

GB 785711 A 11/1957

OTHER PUBLICATIONS

European Searh Report issued in counterpart application No. EP19200282 dated Mar. 30, 2020.

*Primary Examiner* — Gilbert Y Lee (74) *Attorney, Agent, or Firm* — Norton Rose Fulbright Canada LLP (57) ABSTRACT

A seal assembly having: a carbon ring annularly extending about a central axis and having an outer face, and a shrink band annularly extending about the central axis, the shrink band having an inner face, the inner face in contact with the outer face of the carbon ring at a contact interface defined therebetween, the inner face of the shrink band protruding axially beyond the contact interface.

19 Claims, 3 Drawing Sheets

(56) References Cited

U.S. PATENT DOCUMENTS

| | | |
|---|---|---|
| 9,896,953 B2 | 2/2018 | Huppe et al. |
| 9,909,438 B2 | 3/2018 | Duffy et al. |
| 9,989,083 B2 | 6/2018 | Labbe |
| 10,107,121 B2 | 10/2018 | Roberts |
| 10,145,255 B2 | 12/2018 | Miller et al. |
| 10,228,061 B2 | 3/2019 | Pekris et al. |
| 10,450,893 B1 | 10/2019 | Polly et al. |
| 10,480,572 B2 | 11/2019 | Smedresman et al. |
| 10,584,796 B2 * | 3/2020 | Hielkema ............... F16J 15/022 |
| 2006/0033287 A1 * | 2/2006 | Rago .................... F16J 15/441 277/411 |
| 2006/0239816 A1 * | 10/2006 | Labbe .................. F01D 11/003 415/230 |
| 2016/0186865 A1 | 6/2016 | Kostka et al. |
| 2017/0089220 A1 | 3/2017 | Carter et al. |
| 2018/0038489 A1 * | 2/2018 | Hielkema ............... F16K 1/205 |
| 2019/0040957 A1 | 2/2019 | Miller et al. |
| 2019/0323382 A1 * | 10/2019 | Pankratov ............... F16J 15/40 |
| 2019/0331225 A1 | 10/2019 | Legros et al. |

\* cited by examiner

//<br>
CARBON SEAL ASSEMBLY

CROSS-REFERENCE TO RELATED APPLICATIONS

This application claims priority on European Patent Application No. 19200282.2 filed on Sep. 27, 2019, the entire content of which is incorporated herein by reference.

TECHNICAL FIELD

The application relates generally to seals and, more particularly, to carbon seals.

BACKGROUND OF THE ART

Seals may be used in engines, such as aircraft engines, to partition a bearing cavity or the like from a higher pressure environment. Seals, such as carbon seals, typically have two complementary components, and it is common to refer to one of these as a sealing ring and to the other as a runner or counter component.

A non-contacting seal has a sealing ring spaced-apart from the runner by a controlled gap during normal operating conditions. To limit the generation of heat upon any occurrences of contact across the gap, the sealing ring is often made of a low friction material, such as carbon. However, carbon does not have the same thermal expansion coefficient as the runner, which is typically made of metal. Accordingly for the gap to remain relatively constant during normal operating conditions, the carbon ring is surrounded by a metallic ring referred to as a shrink band.

SUMMARY

In one aspect, there is provided a seal assembly comprising: a carbon ring annularly extending about a central axis and having an outer face, and a shrink band annularly extending about the central axis, the shrink band having an inner face, the inner face in contact with the outer face of the carbon ring at a contact interface defined therebetween, the inner face of the shrink band protruding axially beyond the contact interface.

In another aspect, there is provided a seal assembly comprising: a carbon ring annularly extending about a central axis and having an outer face, and a shrink band annularly extending about the central axis, the shrink band having an inner face, the inner face in contact with the outer face of the carbon ring, wherein an end portion of the inner face of the shrink band is free of contact with the carbon ring.

In yet another aspect, there is provided a seal assembly comprising: a carbon ring annularly extending about a central axis and having an outer face, and a shrink band annularly extending about the central axis, the shrink band having an inner face extending from one of annular faces of the shrink band to the other, the inner face in contact with the outer face of the carbon ring, a radial thickness of a material of the shrink band relative to the central axis at lateral sections of the shrink band is less than that at a central section of the shrink band extending between the lateral sections.

DESCRIPTION OF THE DRAWINGS

Reference is now made to the accompanying figures in which.

DETAILED DESCRIPTION

Figure 1:
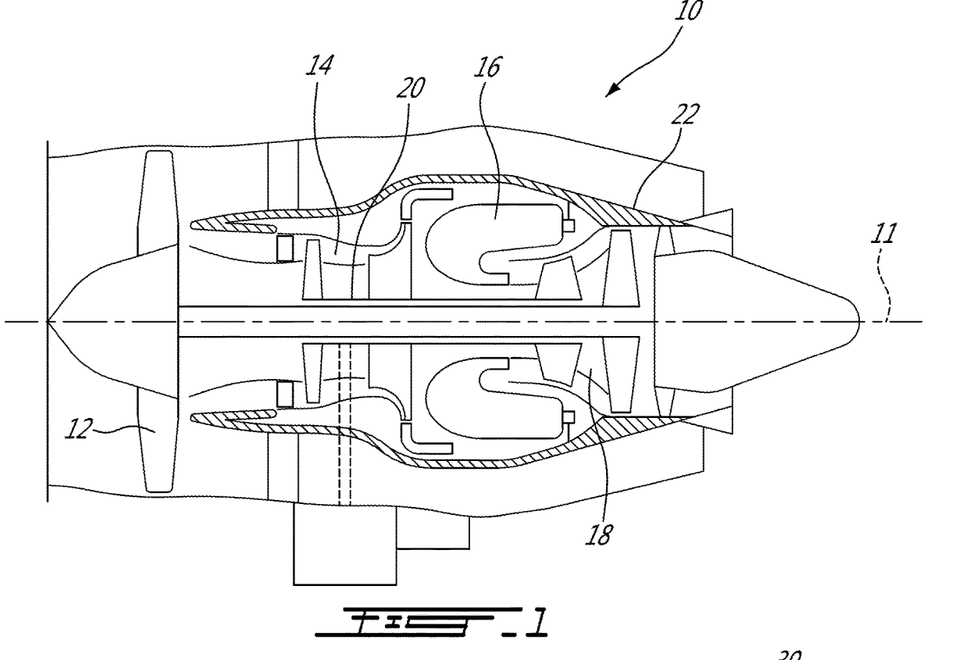
FIG. 1 is a schematic cross sectional view of an aircraft engine.

FIG. 1 illustrates an aircraft engine depicted as a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan 12, the compressor section 14, and the turbine section 18 are rotating about a central axis 11 of the gas turbine engine 10. The gas turbine engine 10 includes an engine shaft 20 (herein a high-pressure shaft) and an engine casing 22 disposed circumferentially around the engine shaft 20. The engine casing 22 is in part used to support the engine shaft 24.

A gas turbine engine such as shown in FIG. 1 can include a plurality of bearings which are used to provide a low-friction interface between components which rotate relative to one another, such as between the high pressure shaft 20 and the low pressure shaft, or between the high pressure shaft 20 and the engine casing 22. Typically, bearings are enclosed in chambers referred to as bearing cavities, and the bearing cavities may be partitioned from the environment, which can be of significantly higher pressure, by seals on each axial side.

Figure 2:
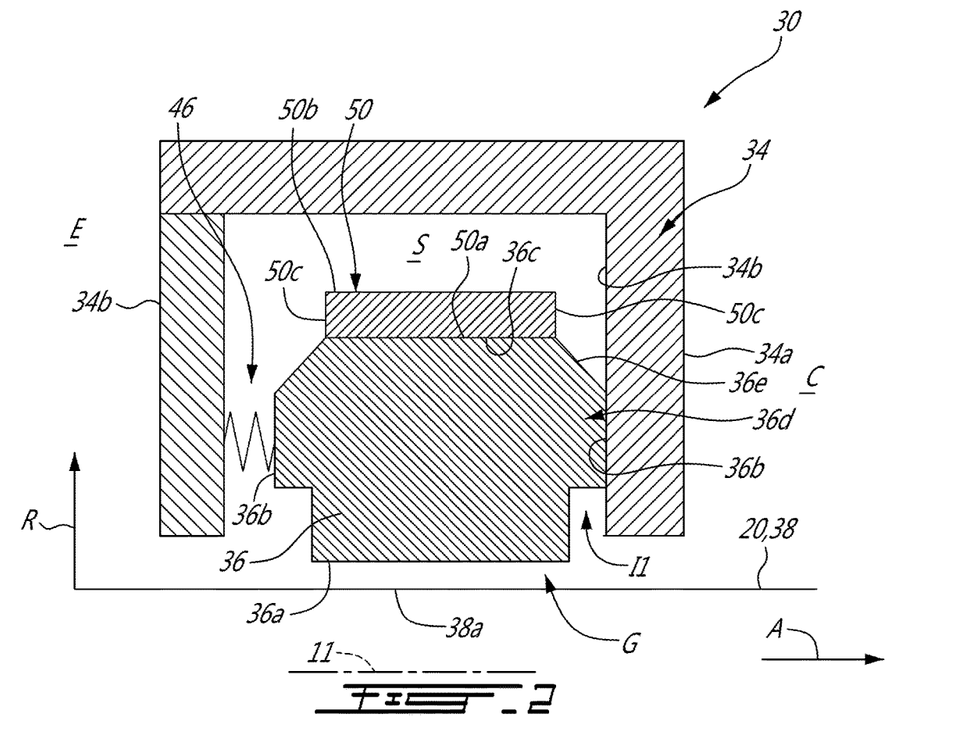
FIG. 2 is a schematic cross-sectional view of a seal assembly in accordance with one embodiment.

Referring now to FIG. 2, the bearing may be located within a bearing cavity C, which is fluidly connected to a lubrication system of the engine 10. The lubrication system is used to supply lubricant to the bearing cavity C for proper lubrication of the bearing contained therein. Seals may be used to prevent lubricant from leaking out of the cavity C. A seal assembly in accordance with one embodiment is generally shown at 30. The seal assembly 30 may be a non-contacting seal.

Herein, the expression "non-contacting seal" refers to a type of seal in which two complementary portions of the seal are designed to be spaced apart by a controlled gap, herein after the gap, G during typical operating conditions. The small, controlled gap G limits gas flow and thus maintains a positive pressure differential leading into the bearing cavity C, and due to the positive pressure, the bearing lubricant may be kept within the cavity C. The gap G may vary in size with, for instance, changes in the operating conditions, vibrations typically occurring during normal operations, thermal expansion, and deformation imparted due to centrifugal force. In some cases, the two complementary portions may contact each other. Such contacts are typically limited during a mission. When they occur, the two components typically do not remain in contact for a long time.

One of the challenges in a non-contacting seal consists in keeping a dimension of the gap G between the two complementary portions substantially constant so that it is able to maintain a pressure differential between the bearing cavity C and an environment E outside the bearing cavity C while limiting contacts between the complementary portions, and in maintaining the dimension of the gap G throughout varying operating conditions. Some occasional contact is accepted. However, prolonged contact may result in excessive heat generation that may impair a proper operation of the gas turbine engine.

In the embodiment shown, the seal assembly 30 includes a housing 34 that houses a sealing ring, also referred to as a carbon ring 36. The sealing ring 36 annularly and continuously extends all around the central axis 11. Stated otherwise, the sealing ring 36 is integral, as opposed to being formed of separate segments. The continuous aspect of the sealing ring 36 imparts a certain amount of structure, such as a continuous arch, which may allow to resist forces such as forces stemming from a pressure differential for instance, and to maintain the controlled gap G. The seal assembly 30 includes a counter component 38 that cooperates with the sealing ring 36. The counter component 38 may correspond to the shaft 20 of the gas turbine engine 10, or to a runner secured thereto. The ring 36 and the counter component 38 are concentric about the central axis 11. In the depicted embodiment, the ring 36 is located radially outwardly to the counter component 38. It is understood that the housing 34 may be defined by the engine casing 22 such that the housing 22 is an integral part of the engine casing 34.

The counter component 38 and the sealing ring 36 rotate relative to each other about the central axis 11. Each of the counter component 38 and the ring 36 defines a sealing face 38a, 36a. The sealing faces 38a, 36a face each other and are spaced apart from each other by the gap G. In the embodiment shown, the gap G is a radial gap that extends axially relative to the central axis 11. The gap G is taken along a radial direction R relative to the central axis 11.

The gap G fluidly connects the bearing cavity C with the environment E outside the bearing cavity C. In the embodiment shown, to limit lubricant contained within the bearing cavity C from leaking in the environment E, pressurized air (e.g. air taken from one or more compressor stage) can be used to increase an air pressure of the environment E beyond the pressure within the bearing cavity C, thereby creating a positive pressure differential therebetween. A controlled, relatively small amount of compressed air may continuously leak from the environment E into the bearing cavity C, which may prevent leakage in the opposite direction. The compressed air may come from the compressor section 14 of the gas turbine engine 10.

In the embodiment shown, the sealing ring 36 is radially spaced apart from the housing 34. This may allow the sealing ring 36 to radially expand with a temperature increase. Stated otherwise, an increase in the temperature may cause the counter component 38 to increase in diameter. The sealing ring 36 may be able to expand because of a radial space S located radially between the sealing ring 36 and the housing 34. On a particular embodiment, the gap G varies as a function of the thermal growth of the sealing ring 36 minus the thermal growth of the counter component.

The radial space S might allow the sealing ring 36 to expand in diameter. However, fluid communication between the bearing cavity C and the environment E via the radial space S must be limited. To that extend, the sealing ring 36 defines annular faces 36b at axial ends thereof. The annular faces 36b extend in the radial direction R. One of the annular faces 36b is in contact with the housing 34. More specifically, the housing 34 defines a radial protrusion, or wall 34a that extends radially toward the counter component 38. The radial protrusion 34a defines an annular face 34b. The annular faces 34b, 36b of both the housing radial protrusion 34a and the sealing ring 36, when in contact, create a sealing interface I1 that limits air and/or lubricant from circulating between the housing 34 and the sealing ring 36.

In the embodiment shown, the annular faces 36b of the sealing ring 36 are defined by noses 36d of the sealing ring 36. The noses 36d may be considered protrusions that protrudes axially along the axial direction A beyond a remainder of the sealing ring 36. In such a case, a radial width, taken along the radial direction R, of the annular face 36b is less than a total radial width of the sealing ring 36. In the embodiment shown, the sealing ring 36 has an outer face 36c opposed to the sealing face 36a. In the depicted embodiment, the outer face 36c of the sealing ring 36 defines chamfers 36e to connect the outer face 36c to the opposed annular faces 36b.

As aforementioned, the pressure in the environment E may be greater than that within the bearing cavity C. As such, the pressure differential biases the sealing ring 36 in abutment against the radial protrusion 34a. For some applications, the difference in pressures between the environment E and the cavity C may be sufficient to create a suitable force that maintains the sealing ring 36 in contact with the housing radial protrusion 34a.

In some other applications, a magnitude of the pressure differential may not be sufficient in keeping the sealing ring 36 in abutment against the radial protrusion 34a. In the embodiment shown, the housing 34 further includes a retaining ring 34b secured to the housing 34 and extending radially away from the engine casing 22 toward the counter component 38. The retaining ring 34b is axially spaced apart from the radial protrusion 34a such that the sealing ring 36 is received axially between the retaining ring 34b and the radial protrusion 34a relative to the central axis 11. A biasing member 46, such as a spring, is disposed axially between the retaining ring 34b and the sealing ring 36, herein between the retaining ring 34b and the other of the annular faces 36b. The biasing member 46 exerts an axial force that pushes the sealing ring 36 in the axial direction A against the radial protrusion 34a such that the sealing interface I1 between the annular faces 36b, 34b of the sealing ring 36 and radial protrusion 34a may be maintained throughout a whole mission of the engine 10 (FIG. 1).

As aforementioned, the efficiency of the seal assembly 30 is directly linked to its ability in maintaining a dimension of the gap G as small as possible without inducing contact between the counter component 38 and the sealing ring 36. However, the sealing ring 36, in the embodiment shown, is made of carbon to limit heat generated by occasional friction with one or both of the counter component 38 and the housing 34 whereas the counter component 38, herein the shaft 20, is made of a different material than carbon, such as a metallic material, such as steel. Steel or other suitable material may be required so that it is able to withstand the high torsional force it is subjected to during operation of the gas turbine engine 10. Consequently, a coefficient of thermal expansion (CTE) of the counter component 38 is greater than that of the sealing ring 36. Therefore, in use, and without a shrink band, an increase in temperature of the seal assembly 30 and of the counter component 38 may result in a decrease in the dimension of the gap G and thus in contact between the sealing ring 36 and the counter component 38. This is undesired.

In the embodiment shown, a shrink band 50 is disposed around the sealing ring 36. The shrink band 50 may be made of a material having a similar CTEs than that of the counter component 38. In the embodiment shown, the shrink band 50 is made of the same material than that of the counter component 38. The shrink band 50 has an inner face 50a and an opposed outer face 50b. The inner face 50a of the shrink band 50 is in engagement with the outer face 36c of the sealing ring 36.

In the embodiment shown, the shrink band 50 is heat shrunk or shrink fitted around the sealing ring 36 so as to decrease a diameter of the sealing ring 36. The inner face 50a of the shrink band 50 may frictionally engage the outer face 36c of the sealing ring 36. In other words, a diameter of the inner face 50a of the shrink band 50 may be less than a diameter of the outer face 36c of the sealing ring 36 before the shrink band 50 is disposed around the sealing ring 36.

In use, a temperature increase may result in expansion of the counter component 38 and of the shrink band 50 in a similar manner as they have similar CTEs. An increase in temperature of the shrink band 50 therefore result in an increase in its diameter and allows the sealing ring 36 to also increase in diameter in the same manner as the shrink band 50. In other words, thermal expansion of the shrink band 50 allows the sealing ring 36 to expand toward an original shape of the sealing ring 36; the original shape corresponding to a shape of the sealing ring 36 before the shrink band 50 was heat shrunk around the sealing ring 36. In some cases, thermal expansion of the shrink band 50 allows a diameter of the sealing ring 36 to extend beyond an original diameter of the sealing ring 36. In a particular embodiment, the seal clearance (e.g., gap G) is controlled thermally. The gap G may gradually close as the speed and temperature increase, thus the term 'controlled gap'. This may be made possible by designing the composite seal ring (e.g., sealing ring 36) to have a similar thermal expansion rate to that of the rotating element with compensation to account for the centrifugal growth.

In the embodiment shown, an axial width of the shrink band 50, which extends from one of annular faces 50c of the shrink band 50 to the other, is equal or less than that of the outer face 36c of the sealing ring 36 excluding the chamfers 36e so that there is no protrusion of the shrink band 50 over the chamfers 36e. However, in some cases, the stress distribution on the shrink band 50, especially at axial ends of the shrink band 50, may cause failure of the shrink band 50. This is undesired.

Figures 3, 4, 5, 6:
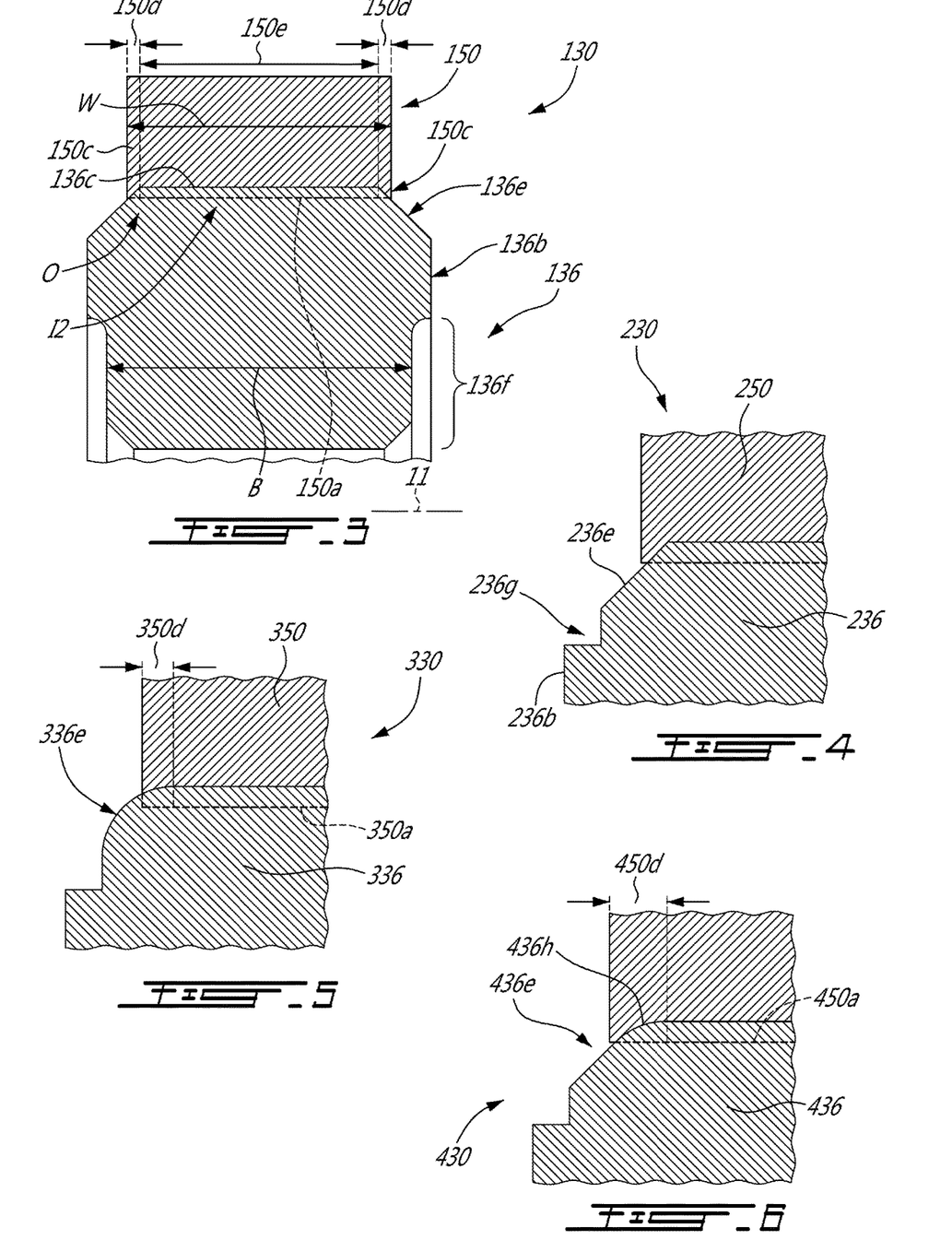
FIG. 3 is a schematic cross-sectional view of a portion of a seal assembly in accordance with another embodiment.
FIG. 4 is a schematic cross-sectional view of a portion of a seal assembly in accordance with another embodiment.
FIG. 5 is a schematic cross-sectional view of a portion of a seal assembly in accordance with another embodiment.
FIG. 6 is a schematic cross-sectional view of a portion of a seal assembly in accordance with another embodiment.

Referring now to FIG. 3, a seal assembly in accordance with another embodiment is generally shown at 130. For the sake of clarity, only the shrink band 150 and the sealing ring 136 of the seal assembly 130 are shown. For the sake of conciseness, only elements that differ from the seal assembly 30 are described herein below. In FIGS. 3-10, radial overlaps are shown between the shrink bands and the sealing rings. These radial overlaps show the difference in diameters of the inner faces of the shrink bands and of the outer faces of the sealing rings before the shrink bands are disposed around the sealing rings.

In the embodiment shown, the inner face 150a of the shrink band 150 contacts the outer face 136c of the sealing ring 136 at a contact interface 12 defined therebetween. The inner face 150a of the shrink band 150 protrudes axially beyond the contact interface 12. Stated differently, a portion of the inner face 150a of the shrink band 150 is free of contact with the sealing ring 136.

As shown in FIG. 3, the portion of the inner face 150a of the shrink band 150 being free of contact with the sealing ring 136 corresponds to axial end portions 150d of the inner face 150a of the shrink band 150. A central portion 150e of the inner face 150a of the shrink band 150 may be entirely in contact with the sealing ring 136 along the contact interface 12. The shrink band 150 may be symmetrically disposed on the sealing ring 136 such that axial widths, relative to the central axis 11, of the axial end portions 150d of the inner face 150a of the shrink band 150 are equivalent to one another.

In the embodiment shown, a ratio of an axial width of the contact interface 12 to an axial width W of the inner face 150a of the shrink band 150 ranges from 1:1.00001 to 1:1.25. The axial width W of the inner face 150a of the shrink band 150 extends from one of annular faces 150c to the other. In other words, a ratio of an axial width, relative to the central axis, of the portion of the inner face 150a of the shrink band 150 free of contact with the sealing ring 136 to the axial width W of the inner face 150a of the shrink band 150 ranges from 1-1/1.00001 to 1-1/1.25.

Still referring to FIG. 3, a portion of the inner face 150a of the shrink band 150 axially overlaps the chamfers 136e defined by the outer surface 136c of the sealing ring 136. In the embodiments shown, the axial end portions 150d of the inner face 150a of the shrink band 150 axially overlaps the chamfers 136e.

The configuration illustrated in FIG. 3 may be achieved by providing the shrink band 150 with a greater axial width in the axial direction A than that of the shrink band 50 shown herein above in FIG. 2 and/or by providing the sealing ring 136 with the outer face 136c having an axial width (excluding the chamfers) in the axial direction A less than that of the outer face 36c of the sealing ring 36 shown above in FIG. 2. Alternatively, the sealing ring may be modified by increasing a dimension of the chamfers so that a portion of the inner face of the shrink band overlap the modified chamfers.

The difference in the axial widths of the inner face 150a of the shrink band 150 and the outer face 136c of the sealing ring 136 is designed such that the shrink band 150 does not contact the radial protrusion 34a (FIG. 2) of the housing 34 (FIG. 2) upon wearing out of the nose 36d of the sealing ring 136. Stated differently, the relative dimensions of the inner face 150a of the shrink band 150 and of the outer face 136c of the sealing ring 136 is determined to ensure the axial width of the inner face 150a of the shrink band 150 is less than an axial width of the sealing ring 136 at the annular faces 136b and less than an axial width B of the sealing ring 136 at a bottom section 136f of the sealing ring 136; the bottom section 136f located radially inward of the annular faces 136b of the sealing ring 136 relative to the central axis 11. Therefore, after wearing out of the nose, the housing 34 (FIG. 2) may contact the sealing ring 136 at the bottom section 136f thereby avoiding contact between the housing 34 and the shrink band 150.

This difference in axial widths between the outer face 136c of the sealing ring 136 and that of the inner face 150a of the shrink band 150 provides an overlap O of the shrink band 150 over the sealing ring 136. This may optimize stress distribution. In a particular embodiment, shear stress exerted between the shrink band 150 and the sealing ring 136 is decreased at extremities of the sealing ring 136 compared to a configuration without said overlap O and in which the end portions 150d of the shrink band 150 contact the sealing ring 136. This may avoid the sealing ring 136 from cracking after extended use and repeated thermal cycle of expansion and contraction.

Other configurations are possible to decrease radial stress exerted on/by the shrink band. Some possible configurations are described herein below with reference to FIGS. 4-11.

Referring now to FIG. 4, a seal assembly in accordance with another embodiment is generally shown at 230. For the sake of conciseness, only elements that differ from the seal assembly 130 described above with reference to FIG. 3 are described herein below.

In the embodiment shown, the sealing ring 136 of the seal assembly 130 of FIG. 3 is modified by truncating the chamfer 136e yielding a shorter chamfer 236e and a cut 236g located radially between the annular faces 236b and the chamfer 236e. In a particular embodiment, the cut 236g allows to maintain a constant maximum diameter of the nose to avoid increasing a surface area of the annular face 236b as the nose 236b wears out.

Referring now to FIG. 5, a seal assembly in accordance with another embodiment is generally shown at 330. For the sake of conciseness, only elements that differ from the seal assembly 230 described above with reference to FIG. 4 are described herein below.

In the embodiment shown, the chamfers 236e of the seal assembly 230 of FIG. 4 are replaced by fillets 336e. A portion of the inner face 350a of the shrink band 350 axially overlaps the fillets 336a. In the embodiment shown, the axial end portions 350d of the inner face 350a of the shrink band 350 axially overlaps the fillets 336e. The portion of the inner face 350a of the shrink band 350 being free of contact with the sealing ring 336 axially overlaps the fillets 336e. The axial end portions 350d of the inner face 350a of the shrink band 350 are free of contact with the fillets 336e. In a particular embodiment, the fillets 336e help in gradually distributing the load on the shrink band 350.

In the embodiment shown, the greater a radius of the fillets 336e, the greater are axial widths of the axial end portions 350d of the inner face 350a of the shrink band 350 and, consequently, the greater is the stress reduction perceived by the shrink band 350 and the sealing ring at the axial end portions 350d compared to a configuration where an entirety of the inner face 350a of the shrink band 350 contacts the sealing ring 336. A ratio of a radius of the fillets 336e over a diameter of the sealing ring 336 at the outer face ranges from 0.003 to 0.075, preferably from 010 to 0.050.

Referring now to FIG. 6, a seal assembly in accordance with another embodiment is generally shown at 430. For the sake of conciseness, only elements that differ from the seal assembly 230 described above with reference to FIG. 4 are described herein below.

In the embodiment shown, the chamfers 236e of the seal assembly 230 of FIG. 4 are replaced by chamfers 436e being rounded with fillets 436h; the fillets 436h being located at radially outer ends of the chamfers 436e. Axial end portions 450d of the inner face 450a of the shrink band axially overlap the fillets 436h and may axially overlap both of the fillets 436h and the chamfers 436e. A ratio of a radius of the fillets 436h over the diameter of the sealing ring 436 at the outer face ranges from 0.003 to 0.075, preferably from 0.010 to 0.050.

In a particular embodiment, providing the fillets 436h at the radially outer ends of the chamfers 436e increases an axial width of the portion of the inner face 450a of the shrink band that is free of contact with the sealing ring 436 compared to the configuration of FIG. 3 or 4 having the chamfers without the fillets. In other words, the axial width of the axial end portions 450d is greater than that of the axial end portions 150d of the seal assembly 130 of FIG. 3. The fillets 436h may allow to further decrease stress at the axial end portions 450d of the inner face 450a of the shrink band and outer face 150a of shrink band compared to the configuration of FIG. 4.

Figure 7:
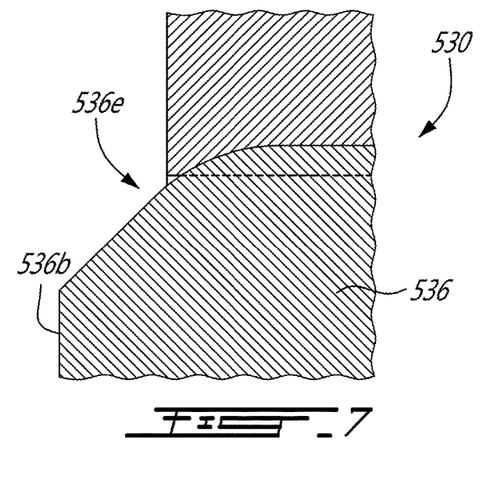
FIG. 7 is a schematic cross-sectional view of a portion of a seal assembly in accordance with another embodiment.

Referring now to FIG. 7, a seal assembly in accordance with another embodiment is generally shown at 530. For the sake of conciseness, only elements that differ from the seal assembly 430 described above with reference to FIG. 6 are described herein below.

In the embodiment shown, the sealing ring 536 differs from the sealing ring 436 of the seal assembly 430 described above with reference to FIG. 6 in that the chamfer 536e extends up to the annular face 536b of the sealing ring 536. In other words, the sealing ring 536 is free of a cut over the nose.

Figure 8:
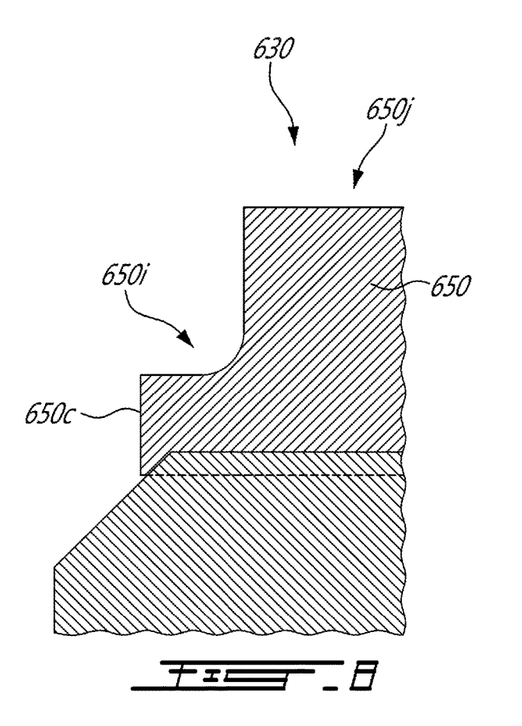
FIG. 8 is a schematic cross-sectional view of a portion of a seal assembly in accordance with another embodiment.

Referring now to FIG. 8, a seal assembly in accordance with another embodiment is generally shown at 630. For the sake of conciseness, only elements that differ from the seal assembly 130 described above with reference to FIG. 3 are described herein below.

In the embodiment shown, a radial thickness of a material of the shrink band 650 relative to the central axis 11 at lateral sections 650i of the shrink band 650 is less than that at a central section 650j of the shrink band 650 extending between the lateral sections 650i. In the embodiment shown, a ratio of an axial width of each of the lateral sections 650i relative to the central axis 11 over an axial width of the shrink band 650, extending from one of annular faces 650c to the other, ranges from 2% to 30%, preferably from 4% to 10%.

In a particular embodiment, having a radial thickness of material of the shrink band being less at the lateral sections 650i than that at the central section 650j allows for a further stress reduction at the extremities of the sealing ring compared to a configurations in which the radial thickness of the shrink band 650 is substantially constant across its axial width. In other words, having a radial thickness of material of the shrink band being less at the lateral sections 650i than that at the central section 650j allows to decrease the stiffness of the shrink band 650 at the lateral sections 650i.

In an alternate embodiment, the shrink band 150 described above with reference to FIG. 3 may be modified by creating grooves each extending from a respective one of the annular faces 150c toward the other. Those grooves effectively decrease a radial thickness of material of the shrink band 150 at the extremities.

Figure 9:
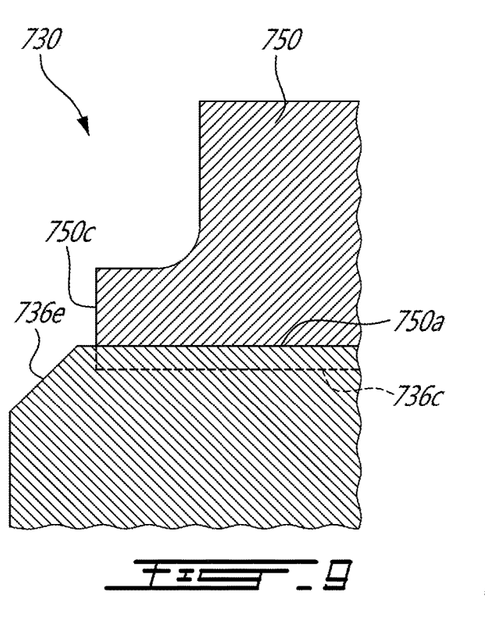
FIG. 9 is a schematic cross-sectional view of a portion of a seal assembly in accordance with another embodiment.

Referring now to FIG. 9, a seal assembly in accordance with another embodiment is generally shown at 730. For the sake of conciseness, only elements that differ from the seal assembly 630 described above with reference to FIG. 8 are described herein below.

In the embodiment shown, the inner face 750a of the shrink band 750 has an axial width extending from one of the annular faces 750c to the other that is less than an axial width of the outer face 736c of the sealing ring 736 excluding the chamfers 736e. In the embodiment shown, an entirety of the inner face 750c of the shrink band 750 is in contact with the sealing ring 736c. Avoiding high shear stress at sealing ring may be achieved by decreasing stiffness of shrink band. In the embodiment shown, a ratio of the axial width of the inner face 750a of the shrink band 750 over that of the outer face 736c of the sealing ring 736 excluding the chamfers 736e ranges from 1:1 to 1:0.9.

Figure 10:
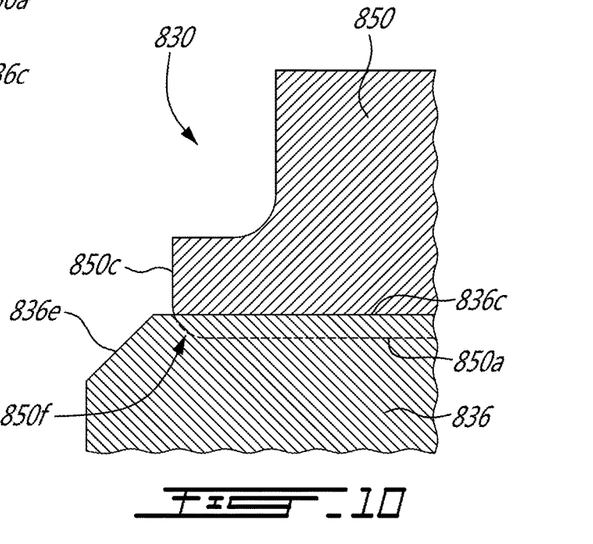
FIG. 10 is a schematic cross-sectional view of a portion of a seal assembly in accordance with another embodiment.

Referring now to FIG. 10, a seal assembly in accordance with another embodiment is generally shown at 830. For the sake of conciseness, only elements that differ from the seal assembly 730 described above with reference to FIG. 9 are described herein below.

In the embodiment shown, the inner face 850a of the shrink band 850 defines fillets 850f at an intersection with the annular faces 850c of the shrink band 850. In the embodiment shown, the fillets 850f axially overlap the outer face 836c of the sealing ring 836. In the embodiment shown, the fillets 850f do not overlap the chamfers 836e of the outer face 836c of the sealing ring 836. In the embodiment shown, the inner face 850a of the shrink band 850 is free of contact with the sealing ring 836 at the fillets 850f. In the depicted embodiment, a radius of the fillets 850f to a radius of the shrink band 850 at the inner face 850a ranges from 0.003 to 0.075, preferably from 0.010 to 0.050.

It is understood that any of the features of the seal assemblies, 30, 130, 230, 330, 430, 530, 630, 730, and 830 described above with reference to FIGS. 3-10 may be used individually and combined in any possible ways.

The disclosed seal assemblies 30, 130, 230, 330, 430, 530, 630, 730, and 830 are made while optimizing geometry of carbon and shrink band. They may improve stress distribution at the tight fit connection between shrink band's inner diameter and carbon ring's outer diameter with some or a combination of the above described configurations. The disclosed seal assemblies 30, 130, 230, 330, 430, 530, 630, 730, and 830 may avoid high shear stress at the carbon side and may avoid crack initiation.

Embodiments disclosed herein include:

A. A seal assembly comprising: a carbon ring annularly extending about a central axis and having an outer face, and a shrink band annularly extending about the central axis, the shrink band having an inner face, the inner face in contact with the outer face of the carbon ring at a contact interface defined therebetween, the inner face of the shrink band protruding axially beyond the contact interface.

B. A seal assembly comprising: a carbon ring annularly extending about a central axis and having an outer face, and a shrink band annularly extending about the central axis, the shrink band having an inner face, the inner face in contact with the outer face of the carbon ring, wherein an end portion of the inner face of the shrink band is free of contact with the carbon ring.

C. A seal assembly comprising: a carbon ring annularly extending about a central axis and having an outer face, and a shrink band annularly extending about the central axis, the shrink band having an inner face extending from one of annular faces of the shrink band to the other, the inner face in contact with the outer face of the carbon ring, a radial thickness of a material of the shrink band relative to the central axis at lateral sections of the shrink band is less than that at a central section of the shrink band extending between the lateral sections.

Embodiments A, B, and C may include any of the following elements in any combinations:

Element 1: a ratio of an axial width of the contact interface relative to the central axis to an axial width of the inner face of the shrink band ranges from 1:1.00001 to 1:1.25. Element 2: the outer face of the carbon ring defines chamfers, the inner face of the shrink band axially overlapping the chamfers. Element 3: the outer face of the carbon ring defines fillets, the inner face of the shrink band axially overlapping the fillets. Element 4: the inner face of the shrink bands defines fillets at an intersection with the annular faces of the shrink band. Element 5: the fillets axially overlap the outer face of the carbon ring. Element 6: a ratio of a radius of the fillets over a radius of the shrink band at the inner face ranges from 0.003 to 0.075. Element 7: a radial thickness of a material of the shrink band relative to the central axis at lateral sections of the shrink band is less than that at a central section of the shrink band extending between the lateral sections. Element 8: a ratio of an axial width of each of the lateral sections over an axial width of the shrink band ranges from 2% to 30%. Element 9: a ratio of an axial width, relative to the central axis, of the end portion of the inner face of the shrink band free of contact with the carbon ring to an axial width of the inner face of the shrink band ranges from 2% to 30%. Element 10: the outer face of the carbon ring defines chamfers, the portion of the inner face of the shrink band free of contact with the carbon ring axially overlapping the chamfers. Element 11: the outer face of the carbon ring defines fillets, the portion of the inner face of the shrink band free of contact with the carbon ring axially overlapping the fillets. Element 12: the portion of the inner face of the shrink band free of contact with the carbon ring corresponds to fillets defined by the inner face of the shrink band at an intersection with the annular faces of the shrink band. Element 13: a radius of the fillets over a radius of the shrink band at the inner face ranges from 0.003 to 0.075. Element 14: a radial thickness of a material of the shrink band relative to the central axis at lateral sections of the shrink band is less than that at a central section of the shrink band extending between the lateral sections. Element 15: a ratio of an axial width of each of the lateral sections over an axial width of the shrink band ranges from 2% to 30%. Element 16: a ratio of an axial width of each of the lateral sections over an axial width of the shrink band ranges from 2% to 30%. Element 17: a portion of the inner face of the shrink band is free of contact with the carbon ring.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A seal assembly comprising: a carbon ring annularly extending about a central axis and having an outer face, and a shrink band annularly extending about the central axis, the carbon ring located radially inwardly of the shrink band relative to the central axis, the shrink band having an inner face, the inner face in contact with the outer face of the carbon ring at a contact interface defined therebetween, the inner face of the shrink band protruding axially beyond the contact interface.

2. The seal assembly of claim 1, wherein a ratio of an axial width of the contact interface relative to the central axis to an axial width of the inner face of the shrink band ranges from 1:1.00001 to 1:1.25.

3. The seal assembly of claim 1, wherein the outer face of the carbon ring defines chamfers, the inner face of the shrink band axially overlapping the chamfers.

4. The seal assembly of claim 1, wherein the outer face of the carbon ring defines fillets, the inner face of the shrink band axially overlapping the fillets.

5. The seal assembly of claim 1, wherein the inner face of the shrink bands defines fillets at an intersection with the annular faces of the shrink band.

6. The seal assembly of claim 5, wherein the fillets axially overlap the outer face of the carbon ring.

7. The seal assembly of claim 5, wherein a ratio of a radius of the fillets over a radius of the shrink band at the inner face ranges from 0.003 to 0.075.

8. The seal assembly of claim 1, wherein a radial thickness of a material of the shrink band relative to the central axis at lateral sections of the shrink band is less than that at a central section of the shrink band extending between the lateral sections.

9. The seal assembly of claim 8, wherein a ratio of an axial width of each of the lateral sections over an axial width of the shrink band ranges from 2% to 30%.

10. A seal assembly comprising: a carbon ring annularly extending about a central axis and having an outer face, and a shrink band annularly extending about the central axis, the carbon ring located radially inwardly of the shrink band relative to the central axis, the shrink band having an inner face, the inner face in contact with the outer face of the carbon ring, wherein an end portion of the inner face of the shrink band is free of contact with the carbon ring.

11. The seal assembly of claim 10, wherein a ratio of an axial width, relative to the central axis, of the end portion of the inner face of the shrink band free of contact with the carbon ring to an axial width of the inner face of the shrink band ranges from 2% to 30%.

12. The seal assembly of claim 10, wherein the outer face of the carbon ring defines chamfers, the portion of the inner face of the shrink band free of contact with the carbon ring axially overlapping the chamfers.

13. The seal assembly of claim 10, wherein the outer face of the carbon ring defines fillets, the portion of the inner face of the shrink band free of contact with the carbon ring axially overlapping the fillets.

14. The seal assembly of claim 10, wherein the portion of the inner face of the shrink band free of contact with the carbon ring corresponds to fillets defined by the inner face of the shrink band at an intersection with the annular faces of the shrink band.

15. The seal assembly of claim 14, wherein a radius of the fillets over a radius of the shrink band at the inner face ranges from 0.003 to 0.075.

16. The seal assembly of claim 10, wherein a radial thickness of a material of the shrink band relative to the central axis at lateral sections of the shrink band is less than that at a central section of the shrink band extending between the lateral sections.

17. The seal assembly of claim 16, wherein a ratio of an axial width of each of the lateral sections over an axial width of the shrink band ranges from 2% to 30%.

18. A seal assembly comprising: a carbon ring annularly extending about a central axis and having an outer face, and a shrink band annularly extending about the central axis, the carbon ring located radially inwardly of the shrink band relative to the central axis, the shrink band having an inner face extending from one of annular faces of the shrink band to the other, the inner face in contact with the outer face of the carbon ring, a radial thickness of a material of the shrink band relative to the central axis at lateral sections of the shrink band is less than that at a central section of the shrink band extending between the lateral sections, a portion of the inner face of the shrink band being free of contact with the carbon ring.

19. The seal assembly of claim 18, wherein a ratio of an axial width of each of the lateral sections over an axial width of the shrink band ranges from 2% to 30%.

* * * * *